Nov. 25, 1958  J. G. JESSEL  2,861,512
APPARATUS FOR MAKING BEVERAGES
Filed March 1, 1954  3 Sheets-Sheet 1

Inventor,
Jonas G. Jessel,
by Hall & Houghton
Attorney.

Nov. 25, 1958 J. G. JESSEL 2,861,512
APPARATUS FOR MAKING BEVERAGES
Filed March 1, 1954 3 Sheets-Sheet 2

Inventor,
Jonas G. Jessel,
by Hall & Houghton
Attorney.

Nov. 25, 1958     J. G. JESSEL     2,861,512
APPARATUS FOR MAKING BEVERAGES
Filed March 1, 1954     3 Sheets-Sheet 3
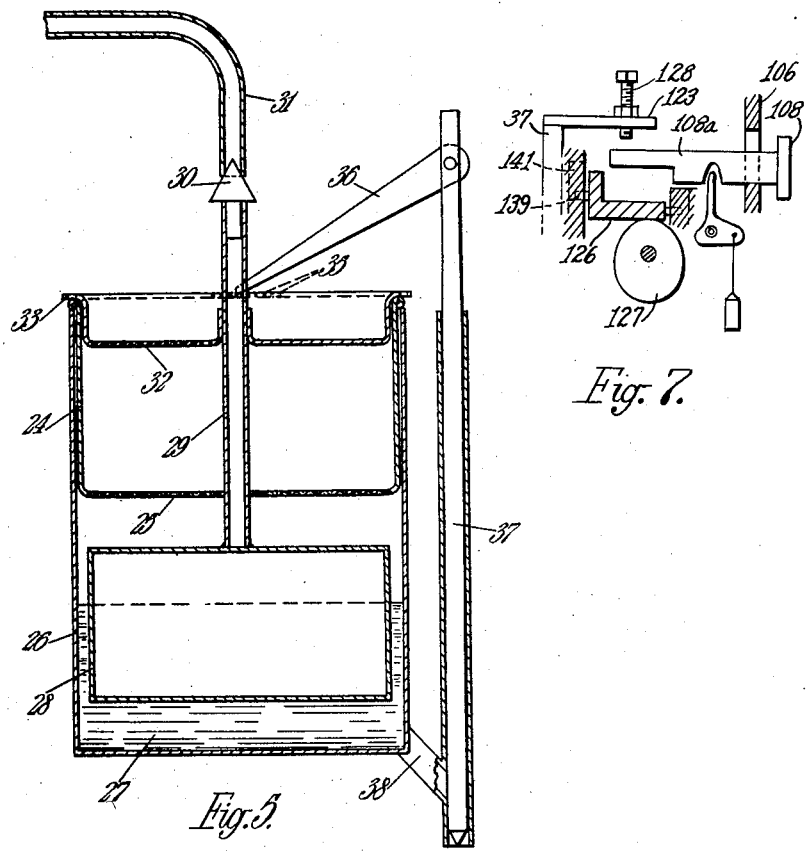
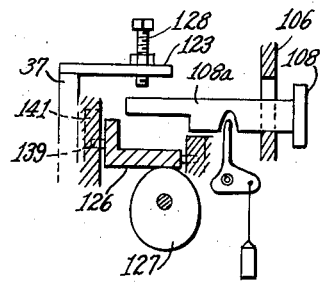
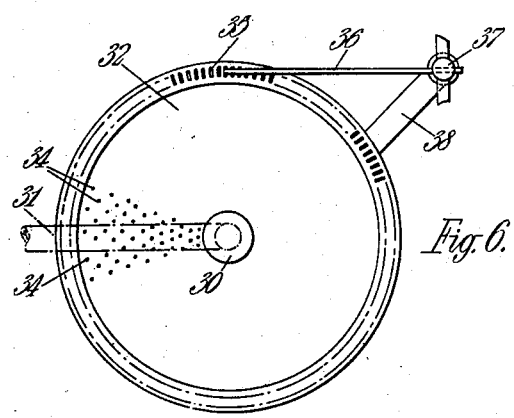
Inventor,
Jonas G. Jessel,
by Hall & Houghton
Attorney.

United States Patent Office 2,861,512
Patented Nov. 25, 1958

2,861,512
APPARATUS FOR MAKING BEVERAGES
Jonas Geoffrey Jessel, London, England
Application March 1, 1954, Serial No. 413,290
Claims priority, application Great Britain March 2, 1953
2 Claims. (Cl. 99—283)

This invention relates to apparatus for making beverages such as tea or coffee and has for its main object to provide an apparatus for making beverages in predetermined quantities at any desired strength.

The invention accordingly consists in an apparatus for making beverages comprising means for infusing controlled or variable quantities of beverage forming material in controlled or measured quantities of heated liquid for predetermined periods of time so as to form a liquid beverage of predetermined strength.

The invention also consists in an apparatus for making beverages comprising a device for retaining a variable quantity of beverage forming material in dry or solid form, means for delivering a supply of heated liquid to said retaining device for a predetermined time so as to effect the infusion of the material and form a beverage of predetermined strength and means for collecting or delivering the beverage when the infusion process is completed.

According to the preferred arrangement, the aforesaid retaining device comprises a perforated container to which the heated liquid is delivered in the form of a spray, and means are provided for rotating either the spray or the perforated container at a predetermined speed so that the strength of the beverage may be determined by the speed and/or number of complete revolutions effected.

Alternatively, means may be provided for discharging the heated liquid through a continuous supply of beverage forming material, and in cases where the invention is to be used in conjunction with a dispensing apparatus such as that described in my British Patent No. 617,171, means may be provided for automatically supplying a predetermined quantity of heated liquid to the beverage forming material each time a similar quantity of beverage or liquid is withdrawn from the dispensing apparatus.

The invention will be more completely understood from the following detailed description which is given in conjunction with the accompanying drawings in which:

Figures 5 and 6 are front and plan views respectively of a further modified form of the apparatus which is suitable for use in conjunction with a dispensing apparatus, Fig. 7 illustrating the association thereof with the dispensing apparatus of said British patent.

Figure 1:
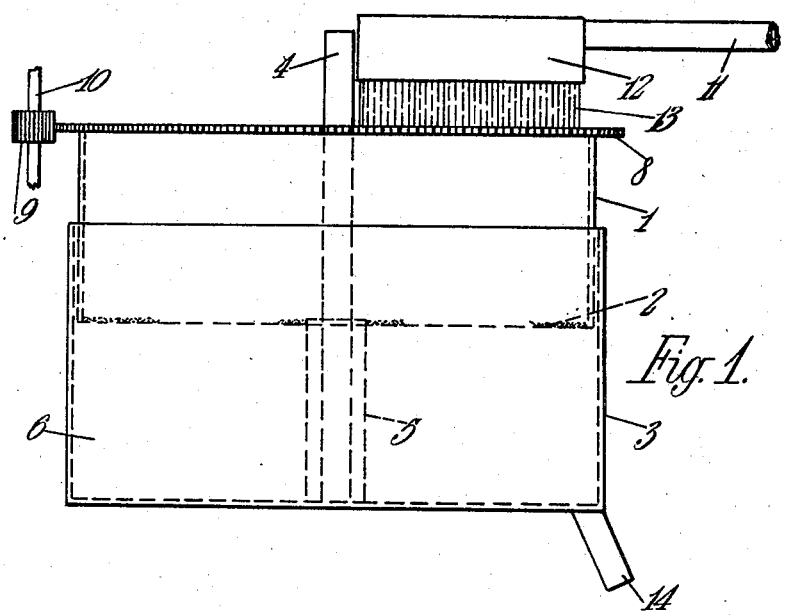
Figures 1 and 2 are front and plan views respectively of an apparatus for brewing tea or other liquids in accordance with the invention.
Figure 2:
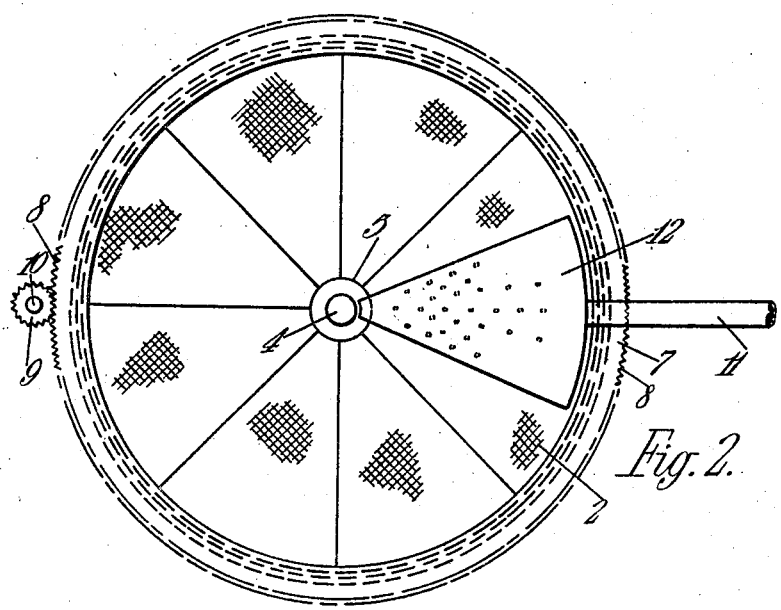

Referring first to Figures 1 and 2 of these drawings, the apparatus consists of a cylindrical container 1, which has a perforated base 2, and is disposed partially within an outer cylindrical container 3, which has a centrally arranged upstanding vertical shaft 4, projecting through the container 1, the lower part of the shaft 4, being surrounded by a short sleeve 5, which serves to hold the container 1 in the desired position so that the perforated base 2 thereof is separated from the base of the outer container 3, by a space 6. The container 1, terminates at its upper end in a peripheral flange 7, having a serrated or toothed edge 8, which meshes with a pinion or gear wheel 9, carried on a shaft 10, which is adapted to be driven by an electric motor or by other suitable means. 11 is a pipe or conduit by means of which boiling water is delivered to a segmental-shaped nozzle or sprayer 12 through which a stream of water 13 may be delivered to the interior of the container 1.

In operation, a measured quantity of dry tea is placed in the container 1, which is then rotated by the shaft 10, and gear wheel 9, while boiling water is discharged on to the tea from the sprayer 12, so as to form liquid tea which passes through the perforated base 2 into the collecting container 3 from which it may be withdrawn as required through the outlet pipe 14 which may be provided with any suitable form of valve or stopcock. Conveniently, this container 1, is rotated at such a speed relatively to the volume of boiling water discharged through the sprayer that a predetermined quantity of liquid tea at a predetermined strength is produced when the container 1 completes one revolution after which it may be replaced by a container of fresh tea and the process repeated. It is to be understood, however, that if preferred, the container may be held stationary and the sprayer rotated round the central axis of the container. It will be appreciated, that the container 1, may be so dimensioned as to hold a considerable quantity of dry tea and the speed of rotation of the container or the sprayer may be relatively slow so that it would only be necessary to supply a new charge of tea at infrequent intervals.

Figure 3:
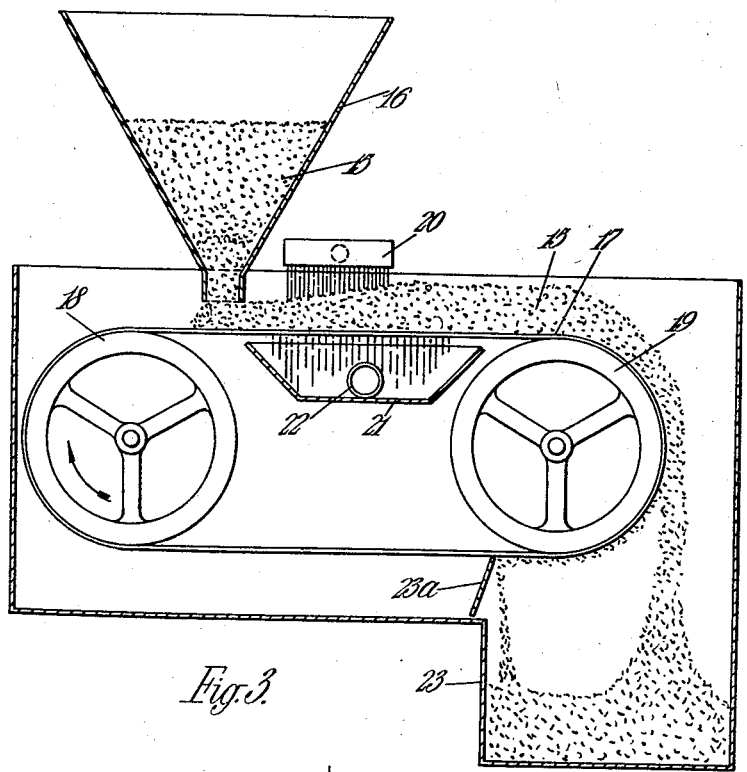
Figures 3 and 4 are front and plan views respectively of a modified form of apparatus for brewing tea or other liquids.
Figure 4:
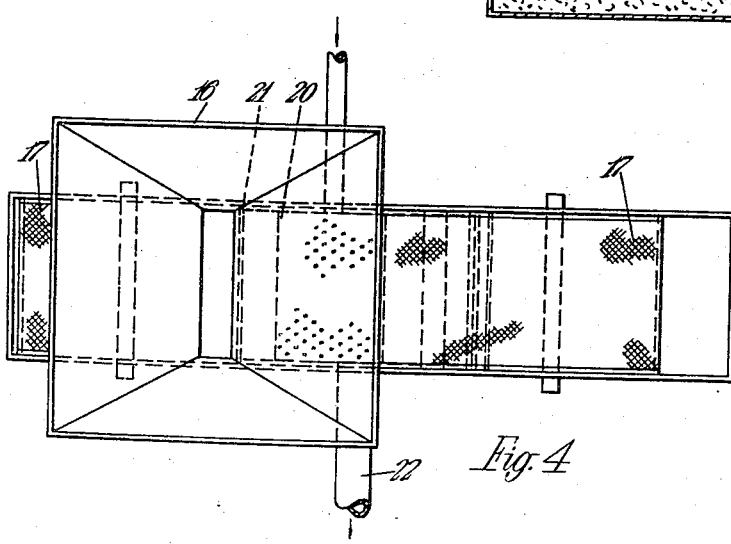

If, however, it is desired to eliminate the need for periodically renewing the charge of tea the boiling water may be arranged to pass through a moving supply of dry tea extracted continuously from a hopper. Such an arrangement is shown in Figures 3 and 4 in which dry tea 15 is supplied to a hopper 16 from which it is fed continuously on to a travelling perforated band 17 passing round a pair of wheels or rollers 18 and 19 one of which 18, is rotated by an electric motor or other suitable means so as to drive the band 17 at a predetermined speed. Boiling water is supplied to a nozzle or sprayer 20 from which it is sprayed on to the dry tea as it passes along on the band 17 thus producing liquid tea which passes through the perforated band into a collecting vessel 21 from which it may be withdrawn through an outlet pipe 22 the used tea leaves passing into a container 23 in the lower part of the apparatus from which they may be collected and destroyed, a scraper 23a being provided for ensuring the removing of all the used tea leaves from the travelling band 17. In this case, the amount of tea extracted from the hopper, the speed of the moving band, and the volume of boiling water supplied, all of which are variable, are so inter-related as to produce liquid tea of any predetermined strength.

If it is desired to operate the infuser automatically in conjunction with a dispenser such as that described in my British Patent No. 617,171, the modified form of apparatus as shown in Figures 5 and 6 may be used. In this modification, the apparatus comprises a cylindrical container 24, which is adapted to contain the dry tea and has a perforated base 25 and is mounted in the upper part of an outer container 26 which serves as a reservoir for the liquid tea 27 and is provided with a float 28 having an upstanding centrally arranged shaft 29 which passes through the container 24 and terminates in a conical-shaped valve 30 which cooperates with the end of a pipe 31 which is adapted to supply boiling water to a shallow tray 32 which is disposed on the upper part of the container 24, this tray having a peripheral lip 33 which seats on the upper edge of the container. This tray is loosely mounted so as to be free to rotate around the shaft 29 and is provided with a set of apertures 34 as shown in Figure 6 so that when water is discharged from the pipe 31 and the tray is rotated a spray of water is projected into the container 24, this spray being caused to rotate round the container as the tray revolves. For the purpose of rotating the tray 32, the upper surface of the rim 33 is provided with a rack 35 which co-operates with a pawl 36 pivotally connected with a slidable rod or plunger 37 which forms part of a dispensing apparatus such as that described in British Patent No. 617,171 and which is lifted in response to the actuation of an operating button to allow a measured quantity of liquid to escape from the reservoir 26 through the outlet pipe 38 after which the return downward movement of the plunger 37 causes the pawl 36 to act upon the rack 35 so as to rotate the spraying tray 32 by a predetermined amount. At the same time, the withdrawal of the liquid from the container 26, allows the float 28 to sink and open the valve 30 thus allowing a supply of boiling water to discharge on to the spraying tray so as to brew a further quantity of tea, this process continuing until the level of liquid tea in the container 26 rises sufficiently to cause the float 28 to lift the valve 30 and shut off the supply of water.

Fig. 7 herein, for purposes of illustration, shows the push-button controlled rod lifting mechanism of said British patent applied to raise the rod 37 of Figs. 5 and 6 herein. The reference numerals in this Fig. 7 correspond to those of the British patent augmented by 100 to distinguish from the other reference numerals used in Figs. 1–6 herein, and the parts correspond exactly to those of the British patent reoriented slightly for clarity of illustration in a single figure. As in the British patent the rod to be lifted (37 herein) is provided with an arm 123 carrying an adjusting screw 128. Rotation of a cam 127 lifts and lowers a raising block 126, guided as by pin and slot means 139, 141. When said block 126 is in its lowered position, as shown, the button 108 can push in the plunger 108a to overlie the block 126 and be pinched between it and the adjusting screw 128 as the block is raised, to lift the rod 37, relower it, and release the plunger 108a when the block 126 is again at its lower position, thus discharging a predetermined quantity of beverage.

While the invention has been described as applied to apparatus for brewing tea, it is to be understood that the apparatus may be equally well employed for brewing coffee or other liquid beverages particularly when it is desired to produce considerable quantities of such beverages at any predetermined strength.

I claim:

1. Apparatus for making and dispensing beverage infusions comprising, in combination, a reservoir for the beverage infusion, automatic valve means for discharging a predetermined quantity of beverage from said reservoir, a perforated annular container for retaining a quantity of beverage forming material and disposed to deliver infusions thereof to said reservoir, sprayer means extending radially of said container and arranged to spray only one of a number of parts of the area of said perforated container at a time and to be movable peripherally with respect thereto, means responsive to operation of said automatic valve means for moving said sprayer into position to spray a part of said container other than the part thereof last sprayed, and means responsive to the level of beverage infusion in said reservoir for supplying hot liquid to said sprayer to flow through only that part of the beverage forming material carried at the particular part of said container with which said sprayer is then associated, for making and delivering to said reservoir a quantity of beverage infusion substantially equal to the predetermined quantity discharged therefrom by the operation of said automatic valve means, the means for supplying hot liquid to the sprayer comprising a pipe terminating above the centre of the container, a valve stem extending through the centre of said annular container and having a head for closing the end of said pipe and a float in said reservoir operatively associated with said valve stem.

2. Apparatus for making and dispensing beverage infusions comprising, in combination, a reservoir for the beverage infusion, automatic valve means for discharging a predetermined quantity of beverage from said reservoir, a perforated annular container for retaining a quantity of beverage forming material and disposed to deliver infusions thereof to said reservoir, sprayer means extending radially of said container and arranged to spray only one of a number of parts of the area of said perforated container at a time and to be movable peripherally with respect thereto, means responsive to operation of said automatic valve means for moving said sprayer into position to spray a part of said container other than the part thereof last sprayed, and means responsive to the level of beverage infusion in said reservoir for supplying hot liquid to said sprayer to flow through only that part of the beverage forming material carried at the particular part of said container with which said sprayer is then associated, for making and delivering to said reservoir a quantity of beverage infusion substantially equal to the predetermined quantity discharged therefrom by the operation of said automatic valve means, said sprayer comprising an annular pan perforated throughout only a relatively narrow angle of its 360° extent, said annular pan resting on said annular container and having ratchet teeth at its periphery, said automatic valve means comprising a longitudinally reciprocated valve rod, and said sprayer moving means comprising a pawl engaging said ratchet teeth and reciprocating with said valve rod.

References Cited in the file of this patent

UNITED STATES PATENTS

| 1,003,317 | Bargallo | Sept. 12, 1911 |
| 1,457,037 | Kreutz | May 29, 1923 |
| 1,837,252 | Carter | Dec. 22, 1931 |
| 1,869,720 | Strand et al. | Aug. 2, 1932 |
| 2,457,903 | Kantor et al. | Jan. 4, 1949 |
| 2,592,761 | Svendsgaard | Apr. 15, 1952 |